US012709324B2

(12) United States Patent
Friedel et al.

(10) Patent No.: US 12,709,324 B2
(45) Date of Patent: Aug. 18, 2026

(54) METHOD FOR OPERATING A STEERING SYSTEM

(71) Applicant: Robert Bosch GmbH, Stuttgart (DE)

(72) Inventors: Michael Friedel, Ruppertshofen (DE); Martin Zimmermann, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 18/728,605

(22) PCT Filed: Dec. 19, 2022

(86) PCT No.: PCT/EP2022/086608
§ 371 (c)(1),
(2) Date: Jul. 12, 2024

(87) PCT Pub. No.: WO2023/134967
PCT Pub. Date: Jul. 20, 2023

(65) Prior Publication Data

US 2025/0058825 A1 Feb. 20, 2025

(30) Foreign Application Priority Data

Jan. 13, 2022 (DE) ..................... 10 2022 200 270.9

(51) Int. Cl.
*B62D 5/04* (2006.01)

(52) U.S. Cl.
CPC .................................. *B62D 5/0496* (2013.01)

(58) Field of Classification Search
CPC ........................... B62D 5/0496; B62D 5/0481
See application file for complete search history.

(56) References Cited

U.S. PATENT DOCUMENTS

2009/0301601 A1* 12/2009 Enerson .................. C06B 43/00
141/38
2015/0167454 A1* 6/2015 Kale ..................... E21B 49/003
702/9

(Continued)

FOREIGN PATENT DOCUMENTS

DE 10 2007 014 345 A1 10/2008
DE 11 2016 000 953 T5 11/2017

(Continued)

OTHER PUBLICATIONS

International Search Report corresponding to PCT Application No. PCT/EP2022/086608, mailed Mar. 28, 2023 (German and English language document) (5 pages).

*Primary Examiner* — Joseph J Dallo
(74) *Attorney, Agent, or Firm* — Maginot, Moore & Beck LLP

(57) ABSTRACT

A method for operating a steering system of a vehicle is proposed, wherein the steering system comprises a steering mechanism and at least one electric motor cooperating with the steering mechanism, wherein a moisture parameter correlating with the moisture in the steering system is determined, wherein, in order to determine the moisture parameter, the steering mechanism is brought into a defined test position and/or blocked in the test position, and the electric motor is actuated with an excitation signal, and wherein the moisture parameter is determined in that, during the actuation of the electric motor with the excitation signal, a motor torque of the electric motor and a rotor position angle of the electric motor is monitored and a change in the motor torque is evaluated according to the rotor position angle.

17 Claims, 3 Drawing Sheets

(56) References Cited

U.S. PATENT DOCUMENTS

| | | | | |
|---|---|---|---|---|
| 2018/0194390 | A1* | 7/2018 | Goto | B62D 5/046 |
| 2019/0217882 | A1* | 7/2019 | Figura | B62D 5/0481 |
| 2019/0247050 | A1* | 8/2019 | Goldsmith | A61F 2/82 |

FOREIGN PATENT DOCUMENTS

| | | | | |
|---|---|---|---|---|
| DE | 10 2017 207 094 A1 | 10/2018 | | |
| DE | 10 2018 112 812 A1 | 12/2018 | | |
| DE | 10 2018 217 474 A1 | 4/2020 | | |
| DE | 10 2019 212 618 A1 | 2/2021 | | |
| WO | WO-2017006623 A1 * | 1/2017 | | B62D 5/0463 |
| WO | WO-2022040712 A1 * | 3/2022 | | F16D 66/00 |

* cited by examiner 14
46
42
20
22
18
36
52
32
28
10
40
48
44
16
30
50
34
54
38
26

METHOD FOR OPERATING A STEERING SYSTEM

This application is a 35 U.S.C. § 371 National Stage Application of PCT/EP2022/086608, filed on Dec. 19, 2022, which claims the benefit of priority to Serial No. DE 10 2022 200 270.9, filed on Jan. 13, 2022 in Germany, the disclosures of which are incorporated herein by reference in their entirety.

BACKGROUND

The disclosure relates to a method for operating a steering system. In addition, the disclosure relates to a computing unit for performing such a method, a steering system with such a computing unit and a vehicle with such a steering system.

To date, only a very small proportion of the mechanical anomalies that can occur during the operation of a vehicle or steering system can be automatically detected. As such, it is up to the driver to detect the majority of anomalies. However, as the trend towards automated and/or autonomous driving increases, manual fault detection of this kind is becoming less and less viable. Furthermore, vehicles with steer-by-wire steering systems which do not require a direct mechanical connection between a steering wheel and the steered vehicle wheels are also known. Due to the mechanical decoupling, mechanical anomalies that can occur in a steering gear, for example, are not directly fed back to the steering wheel, which also makes manual detection more difficult.

For this reason, DE 10 2019 212 618 A1 proposes a method for automatically determining the stiffness of at least one steering assembly and/or the amount of free play in a steering mechanism. A wheel position is thus determined by means of a monitoring device using a wheel position sensor and related to an input variable specified by an electric motor. However, a moisture parameter is not determined in this case. In addition, the steering mechanism is not brought into a defined test position and/or blocked in the test position. In addition, this type of procedure requires the wheel position to be determined, which can be disadvantageous under certain circumstances.

In addition, DE 10 2018 112 812 A1 describes a method for the automated determination of free play in a steering mechanism, in which excitation takes place via a motor torque with different frequencies. In this case too, however, a moisture parameter is not determined. In addition, the steering mechanism is not brought into a defined test position and/or is blocked in the test position. As a result, the excitation can only take place for small torques, as otherwise the entire steering system is moved. Accordingly, the free play in this case can only be determined in a low-load range.

The task of the disclosure is, in particular, to provide a method for operating a steering system with improved properties with regard to detecting moisture in the steering system. This object is achieved by the features of the disclosure, while advantageous configurations and further developments of the disclosure can further be gathered.

SUMMARY

The disclosure relates to a method for operating a steering system of a vehicle, wherein the steering system comprises a steering mechanism and at least one electric motor cooperating with the steering mechanism, wherein a moisture parameter correlating with the moisture in the steering system is determined, in particular automatically and/or automatically, wherein, in order to determine the moisture parameter, the steering mechanism is brought into a defined test position and/or blocked in the test position, and the electric motor is actuated with an excitation signal, and wherein the moisture parameter is determined in that, during the actuation of the electric motor with the excitation signal, a motor torque of the electric motor and a rotor position angle of the electric motor is monitored and a change in the motor torque is evaluated according to the rotor position angle. In the present case, the steering mechanism is thus positioned and/or blocked in the test position in a first process step, in a second process step the steering system is excited by actuating the electric motor with the excitation signal while the steering mechanism is in the test position, and in a third process step a system response of the steering system to the excitation signal is determined and evaluated using the motor torque and the rotor position angle. In this context, the steering mechanism can be positioned in the test position manually, for example by an occupant and/or driver of the vehicle, or automatically and/or automatically by actuating the electric motor accordingly. In addition, the three above-mentioned process steps for determining the moisture parameter can be repeated in a fourth process step for at least one further test position that differs from the test position. In particular, the repetition can concern the same steering assembly or a further steering assembly that differs from the steering assembly. This configuration can advantageously improve the detection of moisture in the steering system. In particular, additional information about the moisture in the steering system can be obtained without additional sensors, such as moisture sensors. Furthermore, efficiency, in particular test efficiency, performance efficiency, component efficiency, energy efficiency and/or cost efficiency, can be improved. In addition, the operational safety of the steering system in particular can be increased. Furthermore, the moisture parameter can be advantageously determined both in a low-load range and in a high-load range.

In the present case, the steering system can be designed as a conventional steering system, in particular as an electric power steering system, and can comprise a mechanical hand grip. Alternatively, however, the steering system can be designed as a steer-by-wire steering system, in which a steering input is advantageously transmitted to the vehicle wheels purely electrically. The steering mechanism further comprises at least one steering assembly and preferably several, in particular different, steering assemblies. The steering mechanism can, for example, comprise a first steering assembly designed as a servo train, a second steering assembly designed as a sensor train and/or a third steering assembly designed as a vehicle axle and/or part of a vehicle axle. In this context, the servo train corresponds in particular to a steering gear of the steering system, while the sensor train corresponds to a steering shaft and/or a steering column of the steering system. Furthermore, the steering system advantageously comprises a steering actuator, in particular an electric and/or electronic steering actuator, which has the electric motor. In this context, a "steering actuator" should primarily be understood as an actuator unit which is preferably coupled to the servo train and is intended to transmit a steering torque to the steering mechanism, in particular the servo train, by means of the electric motor in order to influence the direction of travel of the vehicle. Preferably, the steering actuator is designed to provide a steering torque using the electric motor to support a manual torque applied to a steering handle of the steering system and/or a steering torque for automatic and/or autonomous control of a direction of travel of the vehicle. In addition, the steering system can comprise a locking mechanism, advantageously mechanical, which is provided for blocking, in particular for fixing and/or locking, the steering mechanism in the test position. To this end, the locking mechanism can in particular comprise at least one electrical and/or mechanical lock, for example a steering lock in the region of the steering handle, a locking unit in the region of the steering shaft, in particular an input shaft of the steering shaft, and/or a wheel lock in the region of a vehicle wheel of the vehicle.

Furthermore, the vehicle comprises at least one computing unit, which is intended to perform the method for operating the steering system. The term “computing unit” is mainly understood to mean an electrical and/or electronic unit with an information input, information processing, and an information output. Advantageously, the computing unit also has at least one processor, at least one operating memory, at least one input means and/or output means, at least one operating program, at least one control routine, at least one regulation routine, at least one calculation routine and/or at least one evaluation routine. In particular, the computing unit is provided for determining the moisture parameter. The computing unit is also provided for actuating the electric motor. Furthermore, the computing unit can also be provided for actuating the locking mechanism. In the present case, the computing unit is provided at least for actuating the electric motor with the excitation signal, monitoring a motor torque of the electric motor and a rotor position angle of the electric motor during the actuating of the electric motor with the excitation signal and evaluating a change in the motor torque according to the rotor position angle. In addition, the computing unit can be provided, in particular by actuating the electric motor, to bring the steering mechanism into a defined test position and/or to block it in the test position by actuating the locking mechanism. Preferably, the computing unit is integrated into a control unit of the vehicle and/or a control unit of the steering system, in particular in the form of a steering control unit. In particular, a “moisture parameter” should be understood as a parameter that can be used to infer moisture in the steering system or to determine moisture in the steering system. In the present case, the moisture parameter could be determined directly by evaluating the change in the motor torque according to the rotor position angle. Preferably, however, use is made of the fact that the stiffness of at least one steering assembly of the steering mechanism and/or free play in the steering mechanism changes or can change depending on the moisture in the steering system. Thus, in a first step, the stiffness of the at least one steering assembly and/or the free play in the steering mechanism can be determined by evaluating the change in the motor torque according to the rotor position angle and then, in a second step, the stiffness of the at least one steering assembly and/or the free play in the steering mechanism can be used to determine the moisture parameter. The term “provided” is understood in particular as meaning specifically programmed, designed and/or equipped. In particular, the phrase “an object being provided for a specific function” is intended to mean that the object fulfills and/or performs this specific function in at least one application state and/or operating state.

It is also preferably proposed that the moisture parameter is determined by means of a derivative of the motor torque according to the rotor position angle or a difference quotient of the motor torque and rotor position angle, i.e. using a rate of change of the motor torque as a function of the rotor position angle, which makes it particularly easy to monitor a change in the motor torque as a function of the rotor position angle.

In a further configuration, it is proposed that the change in the motor torque according to the rotor position angle is compared with a reference value to determine the moisture parameter. This in particular makes it possible to provide an advantageously simple evaluation algorithm.

Furthermore, it is proposed that a linearization, advantageously for different load levels, is used when determining the moisture parameter. In this context, it must be taken into account that the stiffness to be determined and/or the free play to be determined, which can be used to determine the moisture parameter, normally has a non-linear relationship. In the present case, however, it was recognized that even when using a corresponding linearization, relatively precise and exact statements about the stiffness and/or the free play and consequently the moisture in the steering system are possible and at the same time a computational effort can be greatly reduced.

If a current temperature is taken into account when determining the moisture parameter, an evaluation result can be made even more precise. Advantageously, the temperature is recorded in the region of the steering mechanism, for example via an additional temperature sensor, or preferably directly in the region of the electric motor. In the latter case, a temperature sensor integrated into the steering actuator can advantageously be used to determine the current temperature, whereby additional costs can be advantageously minimized.

Furthermore, it is proposed that the moisture parameter is determined in a high load range, wherein the electric motor is actuated by means of the excitation signal such that the motor torque is within an upper half of a nominal range of the electric motor. In this way, a particularly precise evaluation can be achieved by carrying out the evaluation in a particularly relevant area with regard to the moisture in the steering system.

According to a particularly preferred configuration, it is proposed that the electric motor is actuated by means of the excitation signal such that the motor torque is continuously increased up to a, in particular defined and/or definable, maximum motor torque, for example +5 Nm, and thus a quasi-static excitation is achieved in particular. This makes it particularly easy to control the excitation of the steering system. In this case, the electric motor is preferably actuated by means of a ramped signal so that the excitation signal is increased continuously and/or ramped. In this case, the motor torque could be increased directly by adjusting the motor torque. Preferably, however, the motor torque is increased by adjusting the rotor position angle, which has the advantage of preventing unwanted accelerations and/or load peaks in the measurement. In addition, it is advantageously proposed in this context that the motor torque is increased continuously in both steering directions in the event that the steering mechanism is completely blocked in the test position, i.e. fixed and/or locked by means of the locking mechanism, for example, and in the event that the steering mechanism is not completely blocked in the test position, only in one steering direction up to the maximum motor torque.

A particularly high level of operational reliability can be achieved in particular if at least one control parameter of a steering controller of the steering system, in particular for actuating the electric motor, is adapted on the basis of the moisture parameter determined. In particular, this allows moisture-sensitive control parameters to be adaptively adjusted on the basis of the moisture parameter determined. In this case, the steering controller advantageously has an electrical connection to the computing unit and is particularly advantageously integrated into the control unit of the vehicle and/or the control unit of the steering system.

It is further proposed that the moisture parameter is compared with a limit value, wherein a safety measure is initiated in the event that the moisture parameter falls below or exceeds the limit value. In particular, the safety measure can comprise at least the generation of a warning message in the vehicle and/or on an external electronic device, for example in the form of a smartphone, and/or the degradation of a driving mode, for example in the form of a reduction in the maximum vehicle speed. In particular, this can achieve a warning effect and further increase operational reliability.

The moisture parameter could, for example, be determined while the vehicle is in motion. Preferably, however, it is proposed that the moisture parameter is determined when the vehicle is stationary and/or in a parked state of the vehicle, for example when the vehicle is temporarily stopped, such as at a traffic light, or when the vehicle is parked. This can advantageously reduce irritation of a driver and/or a passenger while driving.

It is further proposed that the moisture parameter is determined at regular time intervals, for example at each system start, each system shutdown or annually or biennially, such as in particular at a vehicle inspection and/or customer service appointment, in order to monitor a change in the moisture parameter. This is particularly advantageous for quickly detecting changes in the moisture parameter and further increasing the operational safety of the vehicle.

According to one configuration, it is proposed that the steering mechanism comprises at least one steering assembly in the form of a servo train, wherein, in order to determine the moisture parameter, a steering regulator element of the servo train, for example in the form of a gear rack, is positioned in the region of a mechanical end stop of the steering system, and the electric motor is actuated by means of the excitation signal such that the motor torque is continuously increased in the direction of the mechanical end stop up to the maximum motor torque. In this case, the position of the steering regulator element in the region of the mechanical end stop corresponds to the test position. In addition, the aforementioned process steps can be repeated in a further process step for at least one further test position that deviates from the test position. In this context, it is conceivable, for example, that in the further process step, in particular for determining the moisture parameter, the steering regulator element is positioned in the region of a further mechanical end stop of the steering system, in particular opposite the mechanical end stop, and the electric motor is actuated by means of a further excitation signal, in particular equivalent to the excitation signal, such that the motor torque is continuously increased in the direction of the further mechanical end stop up to the maximum motor torque. Alternatively, however, the repetition in the further process step can also relate to a further steering assembly that differs from the steering assembly. This is a particularly advantageous way of determining the moisture parameter, especially in the region of the servo train.

According to a further configuration, it is proposed that the steering mechanism comprises at least one steering assembly in the form of a sensor train, wherein, in order to determine the moisture parameter, the sensor train is blocked in a straight-ahead position, in particular mechanically, for example by actuating the locking mechanism, and the electric motor is actuated by means of the excitation signal such that the motor torque is continuously increased in both steering directions up to the maximum motor torque. In this case, the position of the sensor train in the straight-ahead position corresponds to the test position. In addition, the aforementioned process steps can, in principle, be repeated in a further process step for at least one further test position that deviates from the test position. This is a particularly advantageous way of determining the moisture parameter, especially in the region of the sensor train.

In addition, according to a further configuration, it is proposed that the steering mechanism comprises at least one steering assembly in the form of a vehicle axle or part of a vehicle axle, wherein, in order to determine the moisture parameter, at least one vehicle wheel is blocked, in particular mechanically, for example by actuating the locking mechanism, and the electric motor is actuated by means of the excitation signal such that the motor torque is continuously increased in both steering directions up to the maximum motor torque. In this case, the position of the vehicle wheel in the blocked state corresponds to the test position. In addition, the aforementioned method steps can also be repeated in this case in a further method step for at least one further test position that deviates from the test position. In this context, it is conceivable, for example, that in the further process step, in particular for determining the moisture parameter, at least one further vehicle wheel, in particular opposite the vehicle wheel, is blocked, in particular mechanically, for example by actuating the locking mechanism, and the electric motor is actuated by means of a further excitation signal, in particular equivalent to the excitation signal, such that the motor torque is continuously increased in both steering directions up to the maximum motor torque. Alternatively, however, the repetition in the further process step can also relate to a further steering assembly that differs from the steering assembly. This allows the moisture parameter to be determined in a particularly advantageous way, especially in the region of the vehicle axle or part of the vehicle axle.

The method for operating the steering system is not intended to be limited to the application and embodiment described hereinabove. In particular, the method for operating the steering system in order to achieve the functioning described herein can comprise a number of individual elements, components, and units that differ from the number specified herein.

BRIEF DESCRIPTION OF THE DRAWINGS

Further advantages follow from the description of the drawings hereinafter. The drawings show an embodiment example of the disclosure.

Shown are.

DETAILED DESCRIPTION

Figures 1A, 1B:
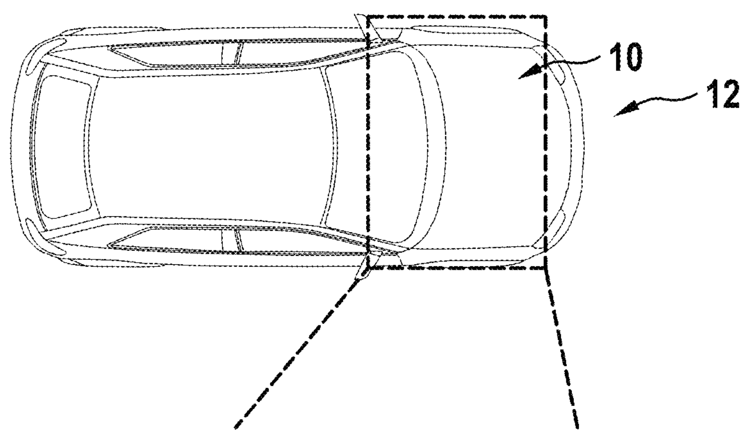
FIG. 1*a-b* a simplified representation of an exemplary vehicle with a steering system, FIG. 2*a-b* exemplary diagrams of various signals for determining a moisture parameter correlated with moisture in the steering system and FIG. 3 an exemplary flow chart with the main method steps of a method for operating the steering system.

FIGS. 1*a* and 1*b* show an exemplary vehicle 12 designed as a motor vehicle with multiple vehicle wheels 34, 36 and with a steering system 10 in a simplified representation. The vehicle 12 is suitable for automated and/or autonomous driving. The steering system 10 is operatively connected to the vehicle wheels 34, 36 and is provided to influence a direction of travel of the vehicle 12. Furthermore, the steering system 10 is designed, purely by way of example, as an electrically assisted steering system and has an electric power assistance in the form of power steering. Alternatively, a steering system can also be designed as a steer-by-wire steering system as is known per se.

The steering system 10 comprises a steering mechanism 14 known per se and a steering actuator 40 cooperating with the steering mechanism 14 and known per se.

The steering mechanism 14 comprises a steering handle 42, in the present case exemplarily designed as a steering wheel, for applying a manual torque and multiple steering assemblies 18, 20, 22 operatively connected to the steering handle 42. In the present case, the steering mechanism 14 comprises a first steering assembly 18 designed as a servo train, a second steering assembly 20 designed as a sensor train and a third steering assembly 22 designed as a vehicle axle and/or part of a vehicle axle. The first steering assembly 18 corresponds to a steering gear, exemplarily designed as a rack-and-pinion steering gear, and comprises at least one steering regulator element 28, in particular designed as a gear rack in the present case. The first steering assembly 18 is intended to convert a steering input at the steering handle 42 into a steering movement of the vehicle wheels 34, 36, in particular designed as front wheels. The second steering assembly 20 corresponds in the present case to a steering shaft and serves to connect, in particular mechanically, the steering handle 42 to the first steering assembly 18 The third steering assembly 22 can comprise at least a part of the tie rods, which are assigned to the vehicle wheels 34, 36, and/or a part of the rims of the vehicle wheels 34, 36. Alternatively, a steering handle could also be designed as a steering lever and/or steering ball or similar. It is also conceivable to dispense with a steering shaft and/or a steering handle, such as in a steer-by-wire steering system.

The steering actuator 40 comprises an electric motor 16 and has an operative connection with the first steering assembly 18, in particular the steering regulator element 28. The steering actuator 40 is intended to provide a steering torque by means of the electric motor 16. In the present case, the steering actuator 40 is at least intended to provide a steering torque in the form of a support torque and to transmit it to the steering regulator element 28.

Furthermore, the steering system 10 has a rotor position sensor system 44 arranged in the region of the steering actuator 40. The rotor position sensor system 44 is provided for contactless detection of at least one operating signal of the electric motor 16 in particular in the present case a rotor position signal or a rotor position angle.

In addition, the steering system 10 has a locking mechanism 46, which is provided for blocking, in particular for fixing and/or locking, the steering mechanism 14. For this purpose, the locking mechanism 46 in the present case comprises multiple electrically and/or mechanically designed locks, in particular a steering lock 48 in the region of the steering handle 42, a first wheel lock 50 in the region of a first vehicle wheel 34 of the vehicle wheels 34, 36 and a second wheel lock 52 in the region of a second vehicle wheel 36 of the vehicle wheels 34, 36. However, it is also conceivable in principle to dispense with such a locking mechanism.

The vehicle 12 further comprises a control unit 54 The control unit 54 is designed as a steering control unit and is therefore part of the steering system 10. The control unit 54 has an electrical connection with the steering actuator 40, in particular the electric motor 16. Furthermore, the control unit 54 has an electrical connection with the rotor position sensor system 44. Furthermore, the control unit 54 has an electrical connection with the locking mechanism 46. The control unit 54 is intended to control the operation of the steering system 10. In the present case, the control unit 54 is at least intended to control the electric motor 16. Alternatively, a control unit could also be different from a steering control unit and, for example, be designed directly as a central vehicle control unit.

The control unit 54 comprises a computing unit 38. The computing unit 38 comprises at least one processor (not depicted), e.g. in the form of a microprocessor, and at least one operating memory (not depicted). In addition, the computing unit 38 comprises at least one operating program stored in the operating memory.

Furthermore, the control unit 54 comprises a steering controller 26 known per se for actuating the electric motor 16. The steering controller 26 has an electrical connection with the computing unit 38. In addition, the steering controller 26 is electrically connected to the electric motor 16. In the present case, the steering controller 26 is provided at least in a driving mode of the vehicle 12 for controlling a position of the steering regulator element 28 and thus, in particular, a direction of travel of the vehicle 12.

Normally, only a very small proportion of the mechanical anomalies that can occur during operation of the vehicle 12 or the steering system 10 are detected automatically, while a large proportion of the anomalies must be detected by the driver himself. However, this fact can increasingly lead to problems in the future, particularly with automated and/or autonomously driving vehicles and/or steering systems in the form of steer-by-wire steering systems. The detection of moisture in the steering system 10 plays a particularly important role here, as such moisture can have a particularly critical effect.

To improve moisture detection and/or to increase operational safety, a corresponding method for operating the steering system 10 is therefore proposed below. In the present case, the computing unit 38 is provided to perform the method and comprises a computer program with corresponding program code means for this purpose.

In the present case, the steering mechanism 14 is first brought into a defined test position and/or blocked in the test position in order to determine a moisture parameter correlated with moisture in the steering system 10. Preferably, the moisture parameter is determined when the vehicle 12 is stationary and/or in a parked state of the vehicle 12. In addition, the positioning of the steering mechanism 14 in the test position can be performed manually, for example by an occupant and/or driver of the vehicle 12, or preferably automatically and/or automatically by actuating the electric motor 16 accordingly. Blocking of the steering mechanism 14 in the test position can furthermore be performed by automated actuating of the locking mechanism 46.

The electric motor 16 is then actuated with an excitation signal. In the present case, the electric motor 16 is actuated by means of the excitation signal such that a quasi-static excitation is achieved, wherein a motor torque of the electric motor 16 is continuously increased up to a maximum motor torque, for example +5 Nm. In this case, the electric motor 16 is actuated by means of a ramped signal, so that the excitation signal is increased continuously and/or ramped. In addition, the motor torque is advantageously increased by adjusting the rotor position angle of the electric motor 16, which can prevent unwanted accelerations and/or load peaks in the measurement. In addition, if the steering mechanism 14 is completely blocked in the test position, the motor torque is continuously increased in both steering directions and if the steering mechanism 14 is not completely blocked in the test position, the motor torque is only continuously increased in one steering direction up to the maximum motor torque. Furthermore, the electric motor 16 is actuated by means of the excitation signal such that the motor torque is within an upper half of a nominal range of the electric motor 16, so that the moisture parameter is determined in a high load range.

The moisture parameter is then determined by monitoring a motor torque of the electric motor 16 and a rotor position angle of the electric motor 16 during actuating of the electric motor 16 with the excitation signal and evaluating a change in the motor torque according to the rotor position angle. The motor torque of the electric motor 16 can, for example, be read out directly from the control unit 54 or detected by means of an additional detection sensor system, while the rotor position angle of the electric motor 16 can advantageously be determined from the rotor position signal of the rotor position sensor system 44. In the present case, a derivative of the motor torque according to the rotor position angle or a difference quotient of motor torque and rotor position angle is formed and compared with a reference value 24 to determine the moisture parameter (see also FIG. 2*b*).

Preferably, use is made of the fact that a stiffness of at least one steering assembly 18, 20, 22 of the steering mechanism 14 and/or free play in the steering mechanism 14 changes or can change depending on the moisture in the steering system 10, in particular by changing the properties of plastic components, such as a belt and/or a screw wheel. Thus, in a first step, the stiffness of the at least one steering assembly 18 20, 22 and/or the free play in the steering mechanism 14 can be determined by evaluating the change in the motor torque according to the rotor position angle and then, in a second step, the stiffness of the at least one steering assembly 18 20, 22 and/or the free play in the steering mechanism 14 can be used to determine the moisture parameter. Alternatively, however, the moisture parameter could also be determined directly by evaluating the change in the motor torque according to the rotor position angle. In this case, the determination of stiffness and/or free play could therefore be dispensed with.

It is also advantageous to use linearization when determining the moisture parameter. In this context, it must be taken into account that the stiffness to be determined and/or the free play to be determined, which can be used to determine the moisture parameter, normally has a non-linear relationship. In the present case, however, it was recognized that even when using a corresponding linearization, relatively precise and exact statements about the stiffness of the at least one steering assembly 18, 20, 22 and/or the free play of the steering mechanism 14 and consequently the moisture in the steering system 10 are possible and at the same time a computational effort can be greatly reduced.

To improve the accuracy of the measurement, a current temperature can also be taken into account when determining the moisture parameter. In this context, particular use is made of the fact that the stiffness of the at least one steering assembly 18, 20, 22 and/or the free play in the steering mechanism 14 changes depending on the current temperature. Accordingly, the same applies to the moisture parameter. Preferably, the temperature is detected directly in the region of the electric motor 16, in particular by means of a temperature sensor system integrated into the steering actuator 40. Alternatively, however, additional temperature sensors could also be used in the region of the electric motor 16 or in the region of the steering mechanism 14. Furthermore, existing temperature sensors in the vehicle 12, for example for displaying an outside temperature, could also be used to determine a temperature. It is also conceivable to completely dispense with the additional determination of a temperature.

Once the moisture parameter has been determined, various actions can be carried out and/or triggered depending on the values determined.

For example, at least one control parameter of the steering controller 26 can be adapted on the basis of the moisture parameter determined, whereby advantageously moisture-sensitive control parameters can be adaptively adapted on the basis of the moisture parameter determined.

Furthermore, the moisture parameter can be compared with a limit value, wherein a safety measure is initiated if the moisture parameter falls below or exceeds the limit value. The safety measure can comprise at least the generation of a notification message in the vehicle and/or on an external electronic device, for example in the form of a notification of a workshop visit, and/or a degradation of a driving mode, for example in the form of a reduction of a maximum vehicle speed.

In the present case, the moisture parameter is also determined at regular time intervals, for example at each system start or each system shutdown, in order to monitor a change in the moisture parameter. In this way, changes in the moisture parameter can be advantageously detected quickly and the operational safety of the vehicle 12 can be further increased. Alternatively, however, it is also conceivable to provide a longer monitoring interval, such as daily, monthly or annually.

In the following, several specific applications of the general facts explained above are now described for the first steering assembly 18 designed as a servo train, the second steering assembly 20 designed as a sensor train and the third steering assembly 22 designed as a vehicle axle and/or part of a vehicle axle.

According to a first aspect, in order to determine the moisture parameter, and in particular in the region of the first steering assembly 18 or the servo train, the steering regulator element 28 is positioned in the region of a mechanical end stop 30 of the steering system 10 and the electric motor 16 is actuated by means of the excitation signal such that the motor torque is continuously increased in the direction of the mechanical end stop 30 up to the maximum motor torque. In this case, the position of the steering regulator element 28 in the region of the mechanical end stop 30 corresponds to the test position. To position the steering regulator element 28 in the test position, the steering regulator element 28 can, for example, be positioned directly in the region of the mechanical end stop 30 by actuating the electric motor 16 and by means of an appropriately taught software function, or it can be moved at a constant movement speed (approx. 10 mm/s to 40 mm/s) in the direction of the mechanical end stop 30 until the test position is reached or the test position is detected by means of a decreasing movement speed. Using the motor torque of the electric motor 16 and the rotor position angle of the electric motor 16, the total stiffness of the servo train and mechanical end stop 30 can then be determined for the corresponding load direction, i.e. in the direction of the mechanical end stop 30. The following applies:

$$\frac{1}{c_1} = \frac{1}{c_{Servo}} + \frac{1}{c_A} \tag{1}$$

The total stiffness $c_1$ of the servo train and mechanical end stop 30 for the corresponding load direction describes the stiffness of the first $c_{Servo}$ steering assembly 18 or the servo train and the stiffness of the mechanical end stop 30. $c_A$ Now that the stiffness of the mechanical end stop 30 is known, the stiffness of the first steering assembly 18 or the servo train can be deduced using equation (1). In particular, when an end stop damper is used, the stiffness of the mechanical end stop 30 is dominated by the proportion of the end stop damper. The stiffness of the first steering assembly 18 or the servo train can then be used to determine the moisture parameter, in particular in the region of the first steering assembly 18 or the servo train.

The aforementioned process steps can then be repeated for the opposite side. In this case, the steering regulator element 28 is positioned in the region of a further mechanical end stop 32 of the steering system, in particular opposite the mechanical end stop 30, and the electric motor 16 is actuated by means of a further excitation signal, in particular equivalent to the excitation signal, such that the motor torque is continuously increased in the direction of the further mechanical end stop 32 up to the maximum motor torque. In this case, the position of the steering regulator element 28 in the region of the further mechanical end stop 32 thus corresponds to a further test position. Positioning of the steering regulator element 28 in the further test position and evaluation of the moisture parameter can be carried out using the methodology described above.

According to a second aspect, in order to determine the moisture parameter, and in particular in the region of the second steering assembly 20 or the sensor train, the sensor train is blocked in a straight-ahead position, in particular by actuating the locking mechanism 46 or, more precisely, the steering lock 48, and the electric motor 16 is actuated by means of the excitation signal such that the motor torque is continuously increased in both steering directions up to the maximum motor torque. In this case, the position of the sensor train in the straight-ahead position thus corresponds to the test position. The sensor train can be positioned in the straight-ahead position manually or preferably by actuating the electric motor 16 and the locking mechanism 46 accordingly. The total stiffness of the sensor train and servo train can then be determined based on the motor torque of the electric motor 16 and the rotor position angle of the electric motor 16. The following applies:

$$\frac{1}{c_2} = \frac{1}{c_{Sensor}} + \frac{1}{c_{Servo}} \tag{2}$$

The total stiffness $c_2$ of the sensor train and servo train describes the stiffness of the second steering assembly 20 or the sensor train and the stiffness of the first steering assembly 18 or the servo train. $c_{Sensor}c_{Servo}$ If the stiffness of the first steering assembly 18 or the servo train has been determined as described above and is therefore known, the stiffness of the second steering assembly 20 or the sensor train can be deduced from equation (2). The stiffness of the second steering assembly 20 or the sensor train can then be used to determine the moisture parameter, in particular in the region of the second steering assembly 20 or the sensor train. In this case, it is not necessary to repeat the process steps, as the excitation takes place in both steering directions, as described above.

According to a third aspect, in order to determine the moisture parameter, and in particular in the region of the third steering assembly 22 or the vehicle axle or the part of the vehicle axle, one of the vehicle wheels 34, 36 is blocked, in particular by actuating the locking mechanism 46 or, more precisely, the wheel lock 50 or the wheel lock 52, and the electric motor 16 is actuated by means of the excitation signal such that the motor torque is continuously increased in both steering directions up to the maximum motor torque. In this case, the other of the vehicle wheels 34, 36 is in a freely rotating state, such as on a lifting platform. In this case, the position of the vehicle wheel 34, 36 in the locked state thus corresponds to the test position. Based on the motor torque of the electric motor 16 and the rotor position angle of the electric motor 16, the total stiffness of the vehicle axle and servo train can then be determined. The following applies:

$$\frac{1}{c_3} = \frac{1}{c_{FZ}} + \frac{1}{c_{Servo}} \tag{3}$$

The total stiffness $c_3$ of the vehicle axle and servo train describes the stiffness of the third steering assembly 22 or the vehicle axle or part of the vehicle axle and the stiffness of the first steering assembly 18 or the servo train. $c_{FZ}c_{Servo}$ If the stiffness of the first steering assembly 18 or the servo train has been determined as described above and is therefore known, the stiffness of the third steering assembly 22 or the vehicle axle or part of the vehicle axle can be deduced using equation (3). The stiffness of the third steering assembly 22 or the vehicle axle or the part of the vehicle axle can then be used to determine the moisture parameter, and in particular in the region of the third steering assembly 22 or the vehicle axle or the part of the vehicle axle.

The aforementioned process steps can then be repeated for the opposite side. The other of the vehicle wheels 34, 36 is blocked and the electric motor 16 is actuated by means of a further excitation signal, in particular one equivalent to the excitation signal, such that the motor torque is continuously increased in both steering directions up to the maximum motor torque. The moisture parameter can again be evaluated using the method described above.

Figure 2A:
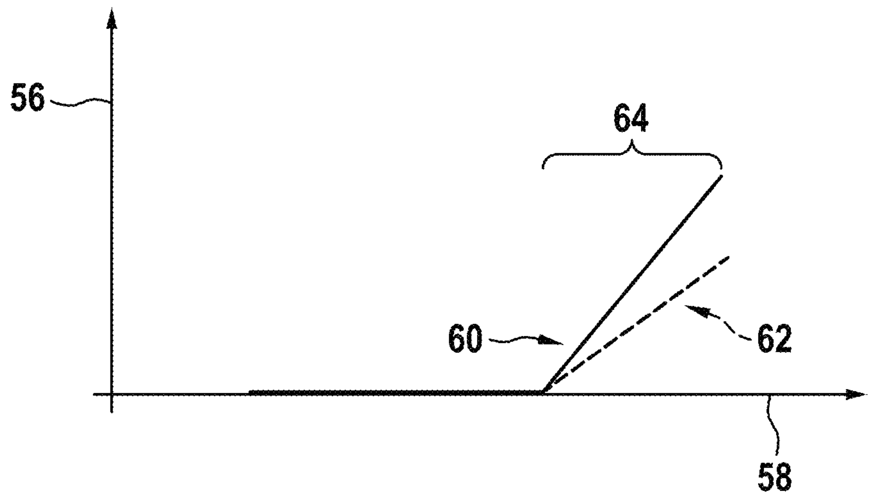
Figure 2B:
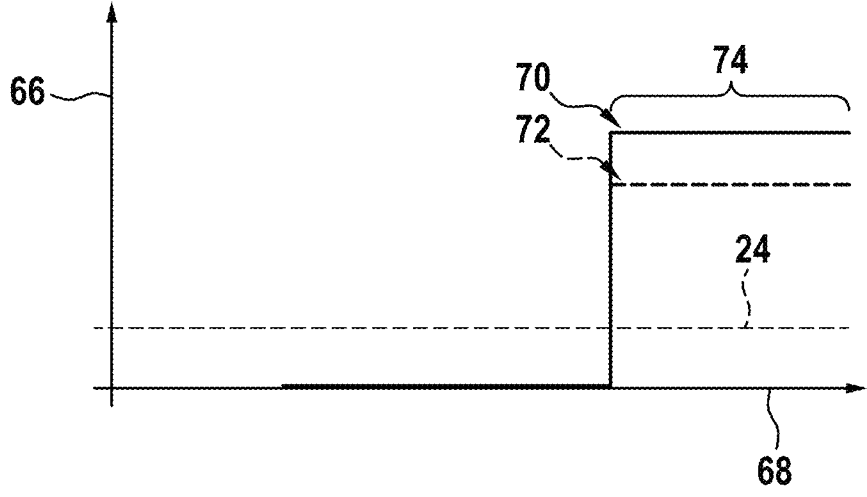

FIGS. 2*a* and 2*b* show exemplary diagrams of various signals for determining the moisture parameter. The example shown in FIGS. 2*a* and 2*b* is limited to the first steering assembly 18 and a stiffness of the first steering assembly 18.

In FIG. 2*a*, the motor torque of the electric motor 16 is plotted on an ordinate axis 56. The rotor position angle of the electric motor 16 is shown on an abscissa axis 58. A curve 60 shows a curve, in particular a linearized curve, of the motor torque according to the rotor position angle in a dry state of the steering system 10. A curve 62 shows a curve, in particular a linearized curve, of the motor torque according to the rotor position angle in a wet state of the steering system 10.

A region 64 schematically shows an exemplary course of the motor torque according to the rotor position angle for determining the moisture parameter in the region of the first steering assembly 18 or the servo train.

In FIG. 2*b*, a stiffness is plotted on a further ordinate axis 66. The rotor position angle of the electric motor 16 is again shown on a further abscissa axis 68. A curve 70 shows a course of the stiffness according to the rotor position angle in the dry state of the steering system 10. A curve 72 shows a course of the stiffness according to the rotor position angle in the wet state of the steering system 10. To determine the curve 70 and the curve 72, a derivative of the motor torque according to the rotor position angle or a difference quotient of motor torque and rotor position angle is formed.

In this case, a region 74 schematically shows an exemplary curve of the total stiffness of the servo train and mechanical end stop 30 for the corresponding load direction, i.e. in the direction of the mechanical end stop 30.

FIGS. 2*a* and 2*b* show that the curves 60, 62 and 70, 72 change depending on the moisture in the steering system 10. This fact can be used to determine the moisture parameter.

Figure 3:
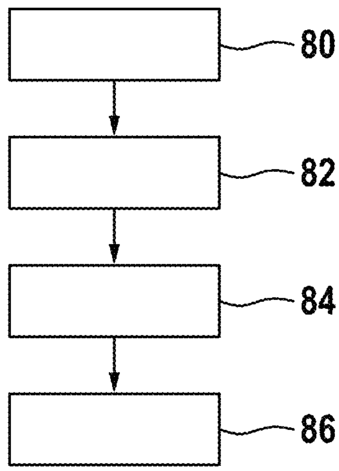

Finally, FIG. 3 shows an exemplary flow chart with the main method steps of a method for operating the steering system 10.

In a process step 80, the steering mechanism 14 is positioned and/or blocked in a corresponding test position. In this context, the positioning of the steering mechanism 14 in the test position can be performed manually, for example by an occupant and/or driver of the vehicle 12, or preferably automatically and/or automatically by actuating the electric motor 16 accordingly.

In a subsequent method step 82, the steering system 10 is excited by actuating the electric motor 16 with the excitation signal, namely while the steering mechanism 14 is in the test position. The electric motor 16 can be actuated by means of the excitation signal such that a quasi-static excitation is achieved.

In a subsequent method step 84, a system response of the steering system 10 to the excitation signal is determined and evaluated using the motor torque of the electric motor 16 and the rotor position angle of the electric motor 16, in particular by means of a derivative of the motor torque according to the rotor position angle or a difference quotient of motor torque and rotor position angle. The system response can then be used to determine the moisture parameter.

In a subsequent process step 86, various actions can then be carried out and/or triggered depending on the moisture parameter determined, such as, for example, adjusting at least one control parameter of the steering controller 26 and/or initiating a safety measure if the limit value is exceeded or not reached.

The exemplary flow chart in FIG. 3 is only intended to describe an exemplary method for operating the steering system 10. In particular, individual method steps can also vary, or additional method steps can be added. For example, the method steps 80, 82 and 84 can be repeated in a method step immediately following the method step 84 for at least one further test position deviating from the test position. In particular, the repetition can concern the same steering assembly 18, 20, 22 or one of the other steering assemblies 18, 20, 22.

The invention claimed is:

1. A method for operating a steering system of a vehicle, wherein the steering system comprises a steering mechanism and at least one electric motor cooperating with the steering mechanism, the method comprising:

determining a moisture parameter correlating with a moisture in the steering system by, bringing the steering mechanism into a defined test position and/or blocking the steering mechanism in the defined test position, actuating the electric motor with an excitation signal, and determining the moisture parameter by monitoring a motor torque of the electric motor and a rotor position angle of the electric motor during the actuation of the electric motor with the excitation signal, and by evaluating a change in the motor torque according to the rotor position angle, wherein at least one control parameter of a steering controller of the steering system for actuating the electric motor is adapted based on the moisture parameter.

2. The method according to claim 1, wherein the moisture parameter is determined using a derivative of the motor torque according to the rotor position angle or a difference quotient of motor torque and rotor position angle.

3. The method according to claim 1, the determining the moisture parameter further comprising:

comparing the change in the motor torque according to the rotor position angle with a reference value.

4. The method according to claim 1, wherein a linearization is used to determine the moisture parameter.

5. The method according to claim 1, wherein a current temperature is taken into account when determining the moisture parameter.

6. The method according to claim 1, wherein:

the moisture parameter is determined in a high load range; and the electric motor is actuated by the excitation signal such that the motor torque is within an upper half of a nominal range of the electric motor.

7. The method according to claim 1, wherein the electric motor is actuated by the excitation signal such that the motor torque is continuously increased up to a maximum motor torque.

8. The method according to claim 7, wherein:

the motor torque is continuously increased in both steering directions with the steering mechanism blocked in the test position; or the motor torque is continuously increased in one steering direction up to the maximum motor torque with the steering mechanism not blocked in the test position.

9. A method for operating a steering system of a vehicle, wherein the steering system comprises a steering mechanism and at least one electric motor cooperating with the steering mechanism, the method comprising:

determining a moisture parameter correlating with a moisture in the steering system by, bringing the steering mechanism into a defined test position and/or blocking the steering mechanism in the defined test position, actuating the electric motor with an excitation signal, and determining the moisture parameter by monitoring a motor torque of the electric motor and a rotor position angle of the electric motor during the actuation of the electric motor with the excitation signal, and by evaluating a change in the motor torque according to the rotor position angle, wherein the moisture parameter is compared with a limit value; and wherein a safety measure is initiated in response to the moisture parameter falling below or exceeding the limit value.

10. The method according to claim 1, wherein the moisture parameter is determined when the vehicle is stationary and/or in a parked state of the vehicle.

11. The method according to claim 1, wherein the moisture parameter is determined at regular time intervals to monitor a change in the moisture parameter.

12. The method according to claim 1, wherein:

the steering mechanism comprises at least one steering assembly configured as a servo train;

a steering regulator element of the servo train is positioned in a region of a mechanical end stop of the steering system to determine the moisture parameter; and the electric motor is actuated by the excitation signal such that the motor torque is continuously increased in a direction of the mechanical end stop up to a maximum motor torque.

13. The method according to claim 1, wherein:

the steering mechanism comprises at least one steering assembly configured as a sensor train;

the sensor train is blocked in a straight-ahead position to determine the moisture parameter; and the electric motor is actuated by the excitation signal such that the motor torque is continuously increased in both steering directions up to a maximum motor torque.

14. The method according to claim 1, wherein;

the steering mechanism comprises at least one steering assembly configured as a vehicle axle or part of a vehicle axle;

at least one vehicle wheel is blocked to determine the moisture parameter; and the electric motor is actuated by the excitation signal such that the motor torque is continuously increased in both steering directions up to a maximum motor torque.

15. A processor configured to perform the method according to claim 1.

16. A steering system with a steering mechanism, with at least one electric motor cooperating with the steering mechanism and with a processor according to claim 15.

17. A motor vehicle, with a steering system according to claim 16.

* * * * *